United States Patent [19]

Austruy et al.

[11] Patent Number: 5,610,444
[45] Date of Patent: Mar. 11, 1997

[54] PROCESS FOR CONTINUOUS MANUFACTURE OF PYROTECHNIC CHARGES CONTAINING A SILICONE BINDER AND COMPOSITIONS CAPABLE OF BEING USED BY THIS PROCESS

[75] Inventors: HervéAustruy, Saint Medard en Jalles; Jean Grignon, Pessac; Jean-Michel Tauzia, Caychac, all of France

[73] Assignee: Societe Nationale des Poudres et Explosifs, Paris, France

[21] Appl. No.: 576,214

[22] Filed: Dec. 21, 1995

[30] Foreign Application Priority Data

Dec. 22, 1994 [FR] France .................. 94 15459

[51] Int. Cl.$^6$ .................................................. C06B 21/00
[52] U.S. Cl. .................................................. 264/3.3
[58] Field of Search .................. 264/3.1, 3.2, 3.3; 252/182.14

[56] References Cited

U.S. PATENT DOCUMENTS

| | | |
|---|---|---|
| 3,367,816 | 2/1968 | Mills et al. . |
| 3,671,480 | 6/1972 | Wada et al. . |
| 3,723,205 | 3/1973 | Scheffee . |
| 3,964,256 | 6/1976 | Plantif et al. . |
| 3,986,908 | 10/1976 | Grebert et al. . |
| 4,088,518 | 5/1978 | Kehren et al. ............................ 149/11 |
| 4,585,600 | 4/1986 | Rollyson et al. ....................... 264/3.3 |
| 4,657,607 | 4/1987 | Perotto et al. . |
| 5,035,843 | 7/1991 | Schmid ................................... 264/3.2 |
| 5,110,845 | 5/1992 | Gray et al. . |
| 5,183,520 | 2/1993 | Wanninger et al. ................. 149/19.91 |
| 5,216,104 | 6/1993 | Okami et al. . |
| 5,223,597 | 6/1993 | Iwakiri et al. ............................ 528/31 |
| 5,282,998 | 2/1994 | Horn et al. ......................... 252/182.14 |
| 5,531,923 | 7/1996 | Le Blanc et al. ................... 252/182.14 |
| 5,547,527 | 8/1996 | Mueller et al. ...................... 149/19.92 |

FOREIGN PATENT DOCUMENTS

| | | |
|---|---|---|
| 2109102 | 5/1972 | France . |
| 2219370 | 4/1977 | Germany . |
| 1061390 | 3/1967 | United Kingdom . |
| 94/06735 | 3/1994 | WIPO . |

OTHER PUBLICATIONS

French Search Report dated Sep. 22, 1995.

*Primary Examiner*—Charles T. Jordan
*Assistant Examiner*—John R. Hardee
*Attorney, Agent, or Firm*—Cushman Darby & Cushman IP Group Pillsbury Madison & Sutro LLP

[57] ABSTRACT

The invention relates to a process for continuous manufacture of pyrotechnic charges containing a silicone binder and to the compositions capable of being used by this process.

The following are introduced continuously into an extruder (1):

- a mixture A of a crosslinkable silicone resin with a crosslinkable silicone gum,
- a mixture B of oxidizing fillers,
- a crosslinking agent C which is common to the resin and to the gum.

The dough obtained is extruded in the form of fuse strings (3) which are cut into strands (5) which are returned into a second extruder (7) to be extruded and cut into the form of blocks (11) in which the binder is crosslinked in an oven (13).

The charges thus obtained find their preferred application in gas pyrotechnic generators for motor vehicle safety.

5 Claims, 1 Drawing Sheet

PROCESS FOR CONTINUOUS MANUFACTURE OF PYROTECHNIC CHARGES CONTAINING A SILICONE BINDER AND COMPOSITIONS CAPABLE OF BEING USED BY THIS PROCESS

FIELD OF THE INVENTION

The present invention relates to the technical field of the pyrotechnic generation of gases that can be employed especially in systems for protecting the occupants of a motor vehicle by means of cushions which are inflated by the combustion gases of a pyrotechnic charge. More precisely, the invention relates to a process for continuous manufacture of extruded plastic-bonded pyrotechnic charges with a silicone binder for pyrotechnic generators of clean and nontoxic gases. The invention also relates to gas-generating plastic-bonded pyrotechnic compositions with a silicone binder capable of being used by virtue of the process according to the invention.

BACKGROUND OF THE INVENTION

For various pyrotechnic requirements and especially to ensure correct inflation of the protective cushions, pyrotechnic gas generators must supply, within extremely short periods of the order of thirty milliseconds, gases which are clean, that is to say free from solid particles capable of constituting hot spots that could damage the wall of the cushion, and which are nontoxic, that is to say with low contents of nitrogen oxides, carbon oxides and chlorine-containing products.

Various classes of pyrotechnic compositions have been developed with this aim in mind.

A first class relates to the compositions based on an alkali-metal or alkaline-earth metal azide in the presence of an inorganic oxidizing agent such as potassium nitrate or a metal oxide. These compositions which may, if appropriate, comprise a binder have two major disadvantages. On the one hand, when they are burning they produce much dust which must be filtered out by relatively large filtering systems, and this increases the weight and the price of the generator at the same time. On the other hand, azides are highly moisture-sensitive materials and these compositions are difficult to store in good conditions for several years in a motor vehicle.

A second class relates to the compositions based on nitrocellulose and nitroglycerine. These compositions, also known by the name of "double-base powders" are very advantageous because they burn very fast and without producing dust. However, they nevertheless have the disadvantage of not being completely stable with time, because of the phenomenon of migration of the nitroglycerine, a phenomenon that, as years go by, impairs the effectiveness of these compositions in a motor vehicle.

A third class relates to so-called "plastic-bonded" compositions consisting basically of an organic binder and of an oxidizing inorganic filler such as, especially, an inorganic perchlorate. These compositions are a priori very advantageous because they have a high rate of burning and an excellent stability on aging.

Thus, Patent FR-A-2 137 619 or its equivalent U.S. Pat. No. 3,723,205 proposes compositions in which the binder is a polyvinyl chloride and in which the oxidizing filler is an ammonium perchlorate in the presence of sodium nitrate as internal chlorine-scavenger. Nevertheless, the use of a chlorine-containing binder in the presence of energetic filler is tricky to implement, especially where safety is concerned.

Plastic-bonded compositions consisting of a silicone binder capable of crosslinking at ambient temperature, also known by the name of "RTV" (Room Temperature Vulcanizable) binder and of potassium perchlorate were then proposed, the potassium atom acting as an internal chlorine-scavenger. Such compositions are, for example, described in Patents FR-A-2 190 776 and FR-B-2 213 254 or in their American equivalents U.S. Pat. Nos. 3,986,908 and 3,964,256.

More recently, plastic-bonded compositions consisting of a silicone binder of the RTV type and of fillers of the metal azide type or nitro compounds such as tetrazole have also been proposed in patent application WO94/06735.

The use of plastic-bonded compositions with a silicone binder is actually very advantageous in the field of motor vehicle safety, insofar as the silicone matrix, when burning, produces a glassy residue which ensures a first filtration of the combustion gases. Nevertheless, compositions of this type have the disadvantage of being tricky to use if the intention is to employ continuous manufacturing processes making use of an extrusion stage, because of the poor mechanical strength of uncrosslinked silicone binders.

From the teaching of Patent U.S. Pat. No. 3,367,816 it is known to extrude continuously an uncrosslinked silicone resin dough to ensure the internal coating of continuously manufactured pipes. However, at the present time it is not known to extrude continuously objects with an uncrosslinked silicone matrix which has a form and dimensions that are fully defined and stable, so as to be capable of being subsequently crosslinked without any change in the geometrical parameters.

At the present time the pyrotechnic compositions with a silicone binder are therefore employed in the form of granulates and not in the form of a single-block charge that has a shape and dimensions which are fully defined, because such charges cannot be obtained by continuous processes but only by noncontinuous processes for forming and curing in a mould, which are prohibitively expensive for the motor vehicle industry.

To ensure the reliability of the operation of the pyrotechnic generator which is subjected to many mechanical stresses, however, it is clearly preferable that it should contain a charge of pyrotechnic composition in the form of a block whose geometry is relatively insensitive to mechanical stresses and especially to repeated vibrations, rather than a bulk granulate charge.

The person skilled in the art is therefore searching for a continuous process which would enable him or her to obtain plastic-bonded pyrotechnic charges with a silicone binder which have a defined and reliable geometry, especially in the case where the said charge must have small thicknesses to be burnt.

SUMMARY OF THE INVENTION

The objective of the present invention is precisely to propose such a process and plastic-bonded pyrotechnic compositions with a silicone binder, which may be put into effect by this process.

The invention therefore relates to a process for continuous manufacture, by kneading and extrusion, of pyrotechnic charges consisting chiefly of a crosslinkable silicone binder, of an oxidizing filler including essentially ammonium perchlorate and sodium nitrate, and of additives, the said constituents of the charge being introduced continuously into an extruder equipped with an extrusion head at the outlet, the said process being characterized in that the constituents of the said binder are introduced in an uncrosslinked form and include at least:

i) a silicone resin of molecular mass which is lower than 20 000 and crosslinkable via hydrosilane groups, ii) a silicone gum of molecular mass which is higher than 100 000 and crosslinkable via hydrosilane groups, iii) a crosslinking agent which is a hydropolysiloxane, so as to permit the formation of a homogeneous dough which is converted into section by extrusion at a temperature not exceeding 30° C. in the form of rods of stable geometry, the said rods thus obtained being then cut to the length of the charge and crosslinked at a temperature which is higher than 30° C.

In general the crosslinking temperature will be between 80° C. and 120° C. It is thus possible, by virtue of the use of a gum and of a resin of very different molecular masses in the constituents of the binder, to obtain, in a single extrusion, rods of geometrical dimensions which are completely stable before and during the crosslinking.

However, according to a preferred embodiment of the invention, the rod sections are obtained after a double extrusion. According to this preferred embodiment the homogeneous dough is extruded, at the extruder outlet, in the form of fuse strings which are cut into strands and returned into a forming machine in order to be converted into sections by extrusion into the form of rods of stable geometry.

According to a first preferred alternative form of the invention the forming machine is a press equipped with an extrusion die.

According to a second preferred alternative form of the invention the forming machine is an extruder equipped with an extrusion head.

According to a third preferred alternative form of the invention the constituents of the charge are introduced into the extruder in the following order:

a) firstly a mixture consisting of the gum and the resin, b) then a mixture consisting of the oxidizing fillers and the additives, c) finally the crosslinking agent.

The invention also relates to compositions for a gas generator pyrotechnic charge which are capable of being used by the continuous process according to the invention and which consist of a silicone binder, of an oxidizing filler including essentially ammonium perchlorate and sodium nitrate, and of additives, the said compositions being characterized by the fact that the said binder is the product of reaction:

a) of at least one silicone resin of molecular mass which is lower than 20 000 and crosslinkable via Si—H hydrosilane groups, mixed with at least one silicone gum of molecular mass which is higher than 100 000 and crosslinkable via hydrosilane groups, b) with at least one crosslinking agent which is a hydropolysiloxane.

According to a preferred alternative form of the invention the composition contains only one crosslinking agent which is reactive, both towards the resin and towards the gum.

DETAILED DESCRIPTION OF INVENTION

The resin is preferably chosen from the group consisting of vinyl polymethylsiloxanes and especially vinyl polydimethylsiloxanes of molecular mass which is lower than 20 000.

The gum is preferably chosen from the group consisting of vinyl polymethylsiloxanes and especially vinyl polydimethylsiloxanes of molecular mass which is higher than 100 000 and polymethylpolyphenylsiloxanes of molecular mass which is higher than 100 000.

Also preferably, the crosslinking agent is chosen from the group consisting of polyhydrosilanes of molecular mass which is between 250 and 700.

According to another preferred alternative form of the invention the molar ratio of the said resin to the said gum is between 9 and 2.

A thickening agent may appear among the additives, and this will be, furthermore, advantageously chosen from the group consisting of silica, polytetrafluoroethylene and carbon black.

In some cases the thickening agent may be mixed with the crosslinking agent.

The fundamental originality of the invention lies in the fact that the silicone binder initially includes, in addition to the crosslinking agent, on the one hand a crosslinkable silicone resin and, on the other hand, a crosslinkable silicone gum.

It is thus possible to adjust the viscosity of the uncrosslinked binder to a value such that, by incorporating the oxidizing filler and the additives, a dough is obtained which can be extruded and cut with geometrical dimensions that are stable at a temperature lower than 30° C.

When the charge is placed in an oven, the crosslinking reactions of the resin and of the gum are taken to completion, the crosslinking of the resin being faster than that of the gum. At the beginning of the cure it is therefore the gum, which is slow to become soft, that mainly ensures the mechanical strength of the charge and, during the cure, when the uncrosslinked gum has softened and begins to crosslink, it is the resin and the gum which have already been crosslinked that ensure the mechanical strength of the charge.

The rod sections can thus be cut to the desired length for the charge, and the structure of the binder is definitively fixed by crosslinking in an oven at a temperature of between 80° C. and 120° C., without any geometrical change.

By virtue of the compositions according to the invention it is thus possible to manufacture continuously extruded pyrotechnic charges with a silicone binder, the form and the dimensions of which are fully reproducible without any machining after extrusion.

A detailed description of the preferred embodiment of the invention is now given with reference to FIG. 1 which shows, in diagrammatic form, a plant permitting the implementation of the process according to the invention, the arrows showing the direction of movement of the products during the process.

The constituents of the charge are introduced into a twin-screw extruder 1 equipped at the outlet with an extrusion head 2 comprising a number of outlets for spinning, the constituents of the binder being introduced in uncrosslinked form. Such an extruder is also called a twin-screw mixing extruder.

As shown in FIG. 1, the constituents are preferably introduced in the following order.

Firstly, a mixture A consisting of the gum and the resin is introduced at the head of the extruder. Next, a mixture B consisting of the oxidizing fillers and the additives is introduced. Finally, the crosslinking agent C, optionally mixed with the thickening agent is introduced.

The said silicone resin has a molecular mass which is lower than 20 000, preferably between 1000 and 3000, and is crosslinkable via →Si—H hydrosilane groups. The said silicone resin will preferably carry vinyl groups and will be chosen from vinyl polydimethylsiloxanes. Its vinyl group functionality will be preferably between 0.5 and 15 equivalents/kg.

The said silicone gum has a weight molecular mass which is higher than 100 000 and capable of ranging up to several million. Its molecular mass is preferably close to 500 000 and it has a viscosity which is much higher than that of the resin, which is why it is called a gum.

It can be crosslinked via hydrosilane groups. The said silicone gum will preferably carry vinyl groups and will be chosen from vinyl polydimethylsiloxanes or vinyl polymethylpolyphenylsiloxanes. Its vinyl group functionality will be preferably between $10^{-4}$ and $5 \times 10^{-3}$ equivalents/kg.

The molar ratio of the said resin to the said gum will be preferably between 9 and 2.

If the value of this ratio is higher than 9, the mixture does not contain enough gum to ensure a stability of the geometrical dimensions after extrusion; if the value of this ratio is lower than 2, the mixture contains to much gum too be capable of being injected by continuous pumping into the extruder.

When the mixture A consisting of the resin and the gum is introduced into the extruder by means of a metering pump, the mixture B, consisting of the oxidizing fillers and the additives is then introduced.

An inorganic perchlorate and especially ammonium perchlorate will be advantageously employed as an oxidizing filler. According to a particularly advantageous embodiment of implementing the invention, a mixture of two types of ammonium perchlorate of different particle size will be employed, so that the mean particle size of the ammonium perchlorate is between 250 μm and 40 μm (micrometers or microns).

Since ammonium perchlorate produces chlorine-containing derivatives on burning, a chlorine-scavenger must be added to it for the purpose of the requirements relating to motor vehicle safety. The preferred chlorine-scavenger within the scope of the present invention is sodium nitrate, which binds chlorine in the form of sodium chloride of submicron size, and therefore without any risk of damaging the walls of the inflatable cushion.

The ammonium perchlorate/sodium nitrate weight ratio will be advantageously between 0.95 and 1.30.

The weight of the mixture of ammonium perchlorate sodium nitrate will, for its part, be advantageously between 78% and 82% of the total weight of the composition.

Besides sodium nitrate, the composition may contain other additives as required, for example adhesion promoters such as vinyltri(2-methoxyethoxy)silane. However, when a thickening agent is employed, the latter will be advantageously added as a mixture with the crosslinking agent, as explained below.

Finally, after introduction of the mixture B, mixture C, consisting of the crosslinking agent is lastly introduced with the thickening agent, if appropriate.

The said crosslinking agent will be a hydropolysiloxane bearing →Si—H hydrosilane groups which are capable of reacting by polyaddition with the vinyl unsaturations of the resin and of the gum. Its molecular mass will be advantageously between 250 and 700. It will be chosen preferably from the group consisting of the polymers of polydimethylsiloxane type containing →Si—H hydrosilane functional groups in a proportion of 10 to 15 equivalents/kg and optionally vinyl functional groups in a proportion of 1 to 5 equivalents/kg.

Figure 1:
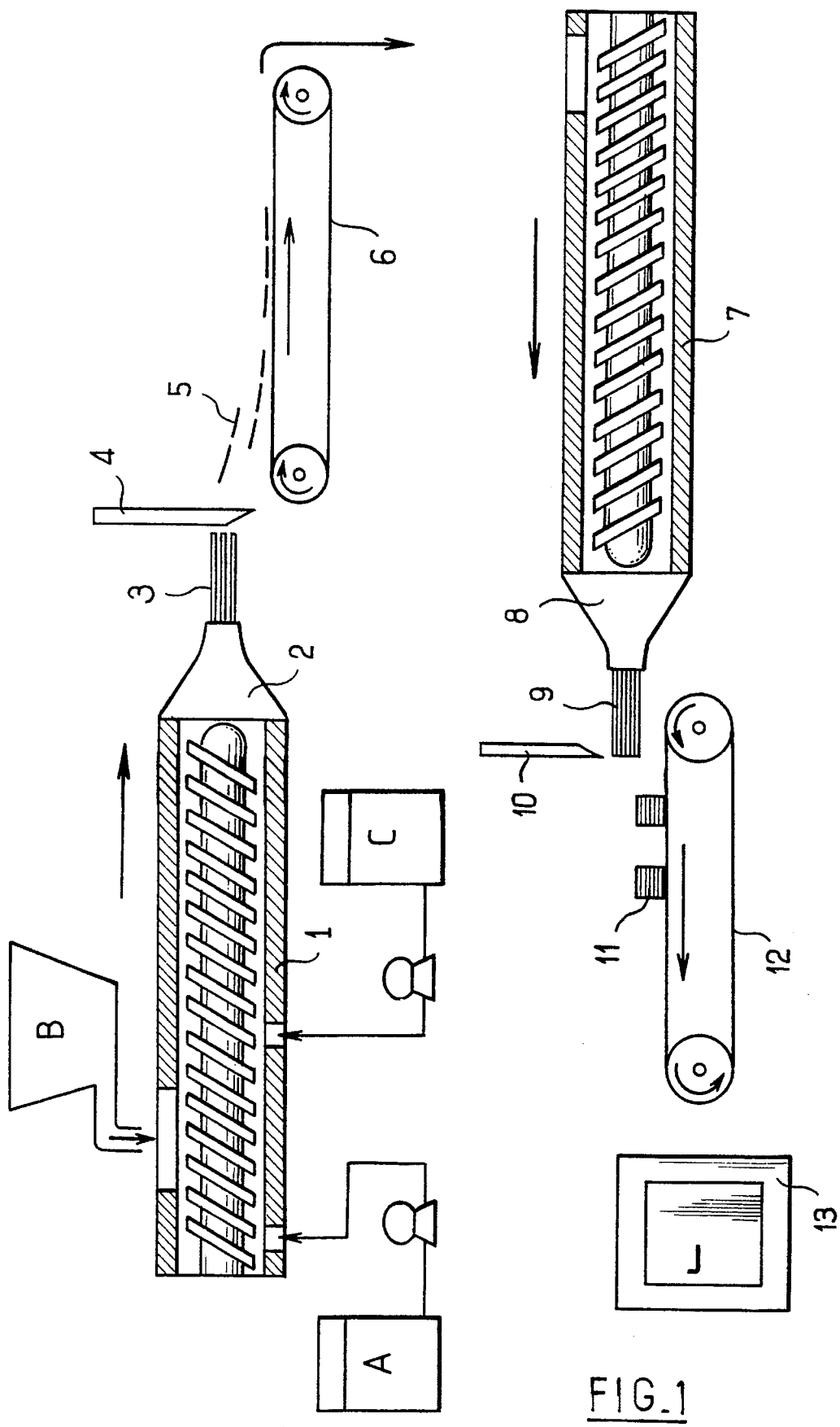
FIG. 1 illustrates schematically an embodiment of the process of the invention for continuous manufacture of pyrotechnic charges.

As indicated above, according to a preferred embodiment of the invention, the composition will contain only one crosslinking agent which is reactive both towards the resin and towards the gum.

The optional thickening agent may be chosen from the various thickening agents that can be employed in doughs containing a silicone binder and will be chosen especially from the group consisting of silica, polytetrafluoroethylene and carbon black. The mixture C is introduced into the extruder 1 by means of a metering pump.

The temperature of the constituents inside the extruder 1 is kept below 30° C.

The constituents of the composition are thus processed continuously in the twin-screw extruder 1 so as to form a homogeneous dough. It must be stressed here that this dough has a very high viscosity and that the extruder 1 must be equipped with tools that are suitable for this kind of processing.

The dough thus obtained is extruded continuously at the extruder outlet in the form of fuse strings 3 which, by virtue of the particular composition of the binder, have sufficient mechanical strength to be capable of being cut into strands 5 in a cutter 4. The strands 5 are recovered by a conveyor belt 6 and conveyed into a forming machine 7.

This machine 7 is basically an extrusion machine. It may be a press equipped with an extrusion die but, preferably and as shown in FIG. 1, it will be a second extruder 7 equipped with an extrusion die 8.

The pyrotechnic composition is thus subjected to a second extrusion during which it is converted into section in the form of rods 9 with the geometry which is desired for the final pyrotechnic charge.

The rods 9 thus obtained are then cut, by a cutting tool 10, to the desired length for the pyrotechnic charge. The blocks 11 thus obtained are conveyed by a conveyor belt 12 to an oven 13 heated to a temperature of between 80° C. and 120° C., so as to complete the crosslinking of the constituents of the binder and thus to fix the structure of the blocks 11.

By virtue of the invention it is therefore possible in this way to manufacture continuously by extrusion, and without any machining operations other than simple cutting, blocks of pyrotechnic charges with a silicone binder which are fully reproducible.

These blocks find their preferred application as pyrotechnic charge in gas generators intended to inflate a protective cushion for occupants of a motor vehicle. The Applicant Company has, in fact, ascertained that the joint presence of a resin and of a gum such as defined by the present invention in the binder of the charge resulted in rates of burning which are particularly suitable for the requirements of motor vehicle safety.

The examples which follow illustrate, without any limitation being implied, some potential implementations of the invention.

EXAMPLE 1

According to the process shown in FIG. 1, hollow cylindrical blocks for a gas generator pyrotechnic charge were manufactured from the following mixtures of constituents (the abbreviation eq./kg denoting equivalents/kg):

Mixture A:

resin: vinyl polydimethylsiloxane (functionality: 0.95 eq./kg) of molecular mass: 1990
70 parts by weight, gum: vinyl polydimethylsiloxane (functionality: $4 \times 10^{-3}$ eq./kg) of molecular mass: 500 000
30 parts by weight.

Mixture B:

ammonium perchlorate particle size 40 μm: 56.25 parts by weight sodium nitrate: 43.75 parts by weight.

Mixture C:

crosslinking agent: polymethylhydrosiloxane: of molecular mass 400,

SiH functionality: 13 eq./kg, vinyl functionality: 3 eq./kg.

The following were thus employed:

mixture A: 18.2 parts by weight, that is 10.92 kg/h mixture B: 80.0 parts by weight, that is 48.00 kg/h mixture C: 1.8 parts by weight, that is 1.08 kg/h.

The composition was extruded and cut into strands 5 which were extruded as hollow cylindrical rods 9 of 39.8 mm external diameter and 14.6 mm internal diameter in an extruder.

The rods were cut into cylindrical blocks.

The blocks were cured in an oven at 120° C. for 30 minutes.

After curing a dimensional change of less than 0.2% was observed.

The combustion gas characteristics of these blocks which are needed to inflate a bag of 60-liter volume are the following:

CO content: 4500 ppm, nitrogen oxides content: 4000 ppm content of chlorine-containing derivatives: lower than 10 ppm.

The speed of burning was 70 mm/s at 20 MPa.

EXAMPLE 2

The procedure was similar to that of Example 1.

Mixture A resin: vinyl polydimethylsiloxane (of molecular mass 3000 and of vinyl group functionality: 0.66 eq./kg): 80 parts by weight, gum: vinyl polydimethylsiloxane (of molecular mass 500 000 and of vinyl group functionality: $4 \times 10^{-3}$ eq./kg): 20 parts by weight.

Mixture B similar to Example 1

Mixture C vinyl polydimethylsiloxanehydrosilane of molecular mass 350 and of functionalities:

as Si—H group: 12 eq./kg, as vinyl group: 2 eq./kg.

The following were thus employed:

mixture A: 18.2 parts by weight, that is 9.1 kg/h mixture B: 80.0 parts by weight, that is 40.0 kg/h mixture C: 1.8 parts by weight, that is 0.9 kg/h.

Objects similar to those in Example 1 were manufactured, which exhibited a burning speed of 55 mm/s at 20 MPa and whose combustion gases have the following characteristics in the case of a 60-liter volume:

CO content: 4000 ppm nitrogen oxides content: 4000 ppm content of chlorine-containing derivatives: lower than 10 ppm.

EXAMPLE 3

The procedure was similar to that of Example 1.

Mixture A:

resin: vinyl polydimethylsiloxane (of molecular mass: 3000 and of vinyl group functionality: 0.66 eq./kg): 65 parts by weight, gum: vinyl polymethyl vinyl polyphenyl siloxane (of molecular mass: $2 \times 10^6$ and of vinyl group functionality $10^{-4}$ eq./kg): 35 parts by weight.

Mixture B:

ammonium perchlorate: 80 μm/200 μm: 50/50) 43.64 parts by weight, sodium nitrate: 36.36 parts by weight.

Mixture C:

Polydimethylsiloxane vinyl hydrosilane of molecular mass 350 and of functionalities:

as Si—H silane groups: 12 eq./kg, as vinyl group: 2 eq./kg.

The following were thus employed:

mixture A: 18.2 parts by weight, that is 11.83 kg/h mixture B: 80.0 parts by weight, that is 52.00 kg/h mixture C: 1.8 parts by weight, that is 1.17 kg/h.

Objects similar to those in Example 1 were manufactured, which exhibited a burning speed of 65 mm/s at 20 MPa and whose combustion gases have the following characteristics in the case of a 60-liter volume:

CO content: 4500 ppm nitrogen oxide content: 3 000 ppm content of chlorine-containing derivatives: lower than 10 ppm.

We claim:

1. Process for continuous manufacture, by kneading and extrusion, of pyrotechnic charges consisting essentially of a crosslinkable silicone binder, of an oxidizing filler including ammonium perchlorate and sodium nitrate, and of additives, the said constituents of the charge being introduced continuously into an extruder equipped with an extrusion head at an outlet, wherein the constituents of the said binder are introduced in uncrosslinked form and include at least:

I) a silicone resin of molecular mass which is lower than 20,000 and capable of being crosslinked via hydrosilane groups, ii) a silicone gum of molecular mass which is higher than 100,000 and capable of being crosslinked via hydrositane groups, iii) a crosslinking agent which is a hydropolysiloxane, so as to permit the formation of a homogeneous dough which is shaped by extrusion at a temperature not exceeding 30° in the form of rods of stable geometry, the said rods thus obtained being then cut to the length of the charge and crosslinked at a temperature which is higher than 30° C.

2. Process for continuous manufacture of pyrotechnic charges according to claim 1, wherein at the outlet of the extruder the homogeneous dough is extruded in the form of fuse strings which are cut into strands and charged into a forming machine in order to be shaped into sections by extrusion in the form of rods of stable geometry.

3. Process according to claim 2, wherein the forming machine is a press equipped with an extrusion die.

4. Process according to claim 2, wherein the forming machine is an extruder equipped with an extrusion head.

5. Process according to claim 1, wherein the constituents of the charge are introduced into the extruder in the following order:

a) firstly a mixture (A) consisting of the gum and the resin, b) then a mixture (B) consisting of the oxdizing fillers and the additives, c) finally the crosslinking agent (C).

* * * * *